United States Patent
Essigmann et al.

(10) Patent No.: US 11,546,308 B2
(45) Date of Patent: *Jan. 3, 2023

(54) MESSAGE PROCESSING FOR SUBSCRIBER SESSIONS WHICH STRETCH OVER DIFFERENT NETWORK DOMAINS

(71) Applicant: TELEFONAKTIEBOLAGET LM ERICSSON (PUBL), Stockholm (SE)

(72) Inventors: Kurt Essigmann, Aachen (DE); Gerasimos Dimitriadis, Salonika (GR); Volker Kleinfeld, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 277 days.

This patent is subject to a terminal disclaimer.

(21) Appl. No.: 16/672,465

(22) Filed: Nov. 3, 2019

(65) Prior Publication Data
US 2020/0067893 A1 Feb. 27, 2020

Related U.S. Application Data

(63) Continuation of application No. 14/408,178, filed as application No. PCT/EP2014/076900 on Dec. 8, 2014, now Pat. No. 10,491,573.

(51) Int. Cl.
*H04L 29/06* (2006.01)
*H04L 9/40* (2022.01)
(Continued)

(52) U.S. Cl.
CPC ........ *H04L 63/0435* (2013.01); *H04L 9/3239* (2013.01); *H04L 63/0414* (2013.01);
(Continued)

(58) Field of Classification Search
CPC .............. H04L 63/0435; H04L 9/3239; H04L 63/0414; H04L 63/0471; H04L 12/1403;
(Continued)

(56) References Cited

U.S. PATENT DOCUMENTS

2008/0254768 A1* 10/2008 Faccin ................. H04W 76/10
455/411
2009/0092247 A1 4/2009 Kido
(Continued)

OTHER PUBLICATIONS

Fumihiro Kanei, Daiki Chiba, Kunio Hato, Katsunari Yoshioka, Tsutomu Matsumoto, Mitsuaki Akiyama, Detecting and Understanding Online Advertising Fraud in the Wild, IEICE Transactions on Information and Systems, 2020, vol. E103.D, Issue 7, pp. 1512-1523, (Year: 2020).*

(Continued)

*Primary Examiner* — Kendall Dolly

(57) ABSTRACT

A technique for hiding topological information in a message that leaves a trusted network-domain is presented. The message pertains to a subscriber session and comprises a Fully Qualified Domain Name (FQDN) of a message originator. The originator is located in a first network domain, and the message is directed towards a destination in a second network domain. A method aspect comprises the steps of receiving the message, determining the FQDN comprised in the message and determining an identifier associated with the message. The identifier comprises at least one of a subscriber identifier, a session identifier and a destination identifier. Further, the method comprises applying a cryptographic operation on the FQDN and the identifier, or on information derived therefrom, to generate a cryptographic value. The message is then processed by substituting at least a portion of the FQDN with the cryptographic value prior to forwarding the message towards the second network domain.

20 Claims, 8 Drawing Sheets

(51) Int. Cl.
*H04M 15/00* (2006.01)
*H04W 4/24* (2018.01)
*H04W 12/02* (2009.01)
*H04L 9/32* (2006.01)
*H04L 12/14* (2006.01)

(52) U.S. Cl.
CPC ........ *H04L 63/0471* (2013.01); *H04M 15/48* (2013.01); *H04M 15/55* (2013.01); *H04M 15/62* (2013.01); *H04M 15/66* (2013.01); *H04M 15/8221* (2013.01); *H04M 15/8228* (2013.01); *H04W 4/24* (2013.01); *H04W 12/02* (2013.01); *H04L 12/1403* (2013.01)

(58) Field of Classification Search
CPC ......... H04M 15/8228; H04M 15/8221; H04M 15/62; H04M 15/55; H04M 15/48; H04M 15/66; H04W 12/02; H04W 4/24
See application file for complete search history.

(56) References Cited

U.S. PATENT DOCUMENTS

| | | |
|---|---|---|
| 2013/0151845 A1 | 6/2013 | Donovan |
| 2014/0206403 A1* | 7/2014 | Buckley ................. H04L 69/24 455/466 |
| 2015/0046826 A1 | 2/2015 | Mann |
| 2015/0180653 A1 | 6/2015 | Nix |
| 2015/0312101 A1 | 10/2015 | Siedelhofer |
| 2016/0359632 A1* | 12/2016 | Mohajeri .............. H04L 9/0872 |

OTHER PUBLICATIONS

Tdschofenig, et al. Diameter AVP Level Security: Scenarios and Requirements; draft-ietf-dime-e2e-sec-req-Ol.txt. Diameter AVP Level Security: Scenarios and Requirements; DRAFT-IETF-DIME-E2E-SEC-REQ-01.TXT, Internet Engineering Task Force. IETF; Standard Working Draft Internet Society (ISOC) 4, Rue Des Falaises CH-1205. Geneva, Switzerland. Oct. 21, 2013.

GSM Association. GSMA LTE Roaming Guidelines. IR.88 version 9.0. Jan. 24, 2013.

Fajardo, V. et al. Diameter Base Protocol. Internet Engineering Task Force (IETF); Request for Comments: 6733. Oct. 2012.

* cited by examiner

MESSAGE PROCESSING FOR SUBSCRIBER SESSIONS WHICH STRETCH OVER DIFFERENT NETWORK DOMAINS

PRIORITY CLAIM

This application is a continuation of U.S. application Ser. No. 14/408,178, filed Dec. 15, 2014, which is a 371 of International Application No. PCT/EP2014/076900, filed Dec. 8, 2014. The contents of these documents are fully incorporated herein by reference.

TECHNICAL FIELD

The present disclosure generally relates to the processing of messages for subscriber sessions. Specifically, the present disclosure pertains to the processing of a session-related message in a scenario in which a message originator and a destination of the message are located in different network domains.

BACKGROUND

Communication networks are ubiquitous in our connected world. Many larger communication networks comprise a plurality of interconnected network domains. In an exemplary mobile communication scenario, such network domains can be represented by a home network of a roaming user terminal on the one hand and a network visited by the roaming user terminal on the other.

Message exchanges between different network domains are often based on a session concept. There exist various messaging protocols suitable for the exchange of session-based messages between network elements located in different network domains. In the above example of message exchanges between network elements of a visited network and a home network, the Diameter protocol is often used. The Diameter protocol is an application layer protocol that provides an Authentication, Authorization and Accounting (AAA) framework for network operators.

A Diameter message contains in clear text the identity of the network element originating the message within a first network domain (e.g., a server in a visited network). Specifically, a Fully Qualified Domain Name (FQDN) identifies the originator of the message. Within the first network domain, originator identities in Diameter messages are processed for purposes such as message routing, message validation and loop prevention. When the Diameter messages leave the first network domain towards a second network domain, a potentially un-trusted operator of the second network domain, or any interceptor at the border of the two network domains, can easily derive the topology of the first network domain from the originator identities (and from other clear text information in the messages, such as optional message path information recorded by the messages while being routed in the first network domain).

For security and secrecy reasons, an operator of the first network domain is strongly interested in hiding the topological information derivable from any Diameter messages leaving the first network domain. The corresponding message processing operations could generally take place in a so-called Diameter Edge Agent (DEA). The DEA is a network element within the first network domain and interfaces the second network domain. In many implementations, the DEA can be considered as the only point of contact into and out of a particular network domain at the Diameter application level. Conventionally, the DEA is configured to primarily support scalability, resilience and maintainability from the perspective of the first network domain.

For the purpose of hiding the originator identity, also called internal host name hereinafter, the DEA could be configured to replace it in every Diameter message leaving the first network domain with an arbitrary ("dummy") host name, also called external host name hereinafter. For a proper addressing of an incoming message that is received in response to an outgoing message in which the originator identity has been hidden, the internal host name has to be restored again in the incoming message. To this end, the DEA may maintain a mapping table that defines associations between pairs of internal and external host names.

It has, however been found that maintaining a mapping table at the DEA is disadvantageous from various perspectives. First, the DEA has to perform a dedicated look-up operation in the mapping table for each messaging step within a subscriber session that crosses the network domain boarder. Such look-up operations increase the overall system load. Further, memory resources that are consumed by the mapping table increase linearly with the number of active sessions, which limits the number of sessions that can be handled by one DEA. This disadvantage is aggravated by the fact that the mapping table is often replicated for security reasons in non-volatile memory. Still further, entries in the mapping table for sessions that have been silently terminated must be regularly cleaned up, which becomes an increasingly tedious task as the number of table entries rises. Also synchronization of DEAs that operate in a redundant manner becomes more complex because the mapping table has to be synchronized also.

It will be evident that the above drawbacks are not specific to the Diameter protocol or the roaming scenario exemplarily described above. Similar problems also occur in other messaging scenarios across domain borders when the messages potentially expose topological or other information.

SUMMARY

Accordingly, there is a need for a message processing solution that avoids one or more of the disadvantages set forth above, or other disadvantages, associated with clear text in messages that leave a particular network domain.

According to a first aspect, a method of processing a message for a subscriber session is provided, wherein the message comprises an FQDN of an originator of the message and wherein the originator is located in a first network domain and the message is directed towards a destination in a second network domain. The method comprises receiving the message and determining the FQDN comprised in the message. The method further comprises determining an identifier associated with the message, wherein the identifier comprises at least one of a subscriber identifier, a session identifier and a destination identifier. Still further, the method comprises applying a cryptographic operation on the FQDN and the identifier, or on information derived therefrom, to generate a cryptographic value, processing the message by substituting at least a portion of the FQDN with the cryptographic value, and forwarding the processed message towards the second network domain.

One or both of the first network domain and the second network domain may be a closed domain such as a domain associated with a specific Internet Service Provider (ISP) or mobile network operator. The methods and method aspects presented herein may be performed by one or more network elements located within or interfacing a particular network domain (e.g., one of the first network domain and the second network domain). In a similar manner, also the originator of the message and the message destination may be realized in the form of network elements located within different network domain.

The network elements acting as originator and destination may be configured as a client or a server from the perspective of a particular protocol defining the message format.

The subscriber session may comprise one or multiple transactions, such as the exchange of request and answer messages. In certain implementations, the subscriber session may be a stateful session. The subscriber session may be implemented as part of an application layer protocol.

The subscriber session may have been set up for a subscriber terminal. The subscriber terminal may be associated with a particular subscription uniquely identified by the subscriber identifier. The session identifier may be an identifier generated in accordance with a particular protocol underlying the messaging procedure. In certain variants, the session identifier may include the subscriber identifier. The destination identifier may have the same format as an identifier of the message originator. As such, the destination identifier may be constituted by or comprise an FQDN of the destination.

The FQDN of the message originator and/or destination may take the form of a domain name in accordance with the Domain Name System (DNS). In some implementations, the FQDN may specify multiple domain levels.

The cryptographic operation applied on the FQDN and the identifier, or an information derived from (such as a portion of the FQDN and/or a portion of the identifier), may comprise one or more operational steps. In certain variants, the cryptographic operation comprises application of at least one cryptographic function. The cryptographic function may be jointly applied on the FQND and the identifier, or on information derived therefrom. The cryptographic function may be symmetric. For example, the cryptographic function may be based on a cryptographic key that belongs to a symmetric key pair.

In one example the subscriber session is a mobility management session, for example for a subscriber terminal. In such a case the first network domain may belong to a home network and the second network domain may belong to a visited network from the perspective of the subscriber terminal, or vice versa.

When the subscriber session is a mobility management session, or any other session, the cryptographic operation may generate the same cryptographic value for a particular subscription (e.g., subscriber terminal) as long as the same originator serves the particular subscription. As an example, different mobility management sessions for the particular subscription may result in the same cryptographic value as long as the originator (and thus the originator FQDN) does not change.

In other cases the subscriber session may be a charging session (e.g., for a specific subscription or subscriber terminal). The charging session may take place for off-line or with on-line charging.

When the session is a charging session, or any other session, the cryptographic operation may generate different cryptographic values for different subscriber sessions of a particular subscription (e.g., subscriber terminal). As such, the cryptographic operation may be applied such that for one and the same originator FQDN but different session identifiers, different cryptographic values are generated. Additionally, or in the alternative, the same cryptographic value may be generated by the cryptographic operation as long as the session identifier, and the originator FQDN, do not change.

For subscriber sessions associated with different subscriber identifiers and hosted by one and the same originator, as a rule, different cryptographic values may result. In one implementation, the cryptographic operation is configured so that the number of different cryptographic values that can be generated by the cryptographic operation is limited to a maximum number (e.g., less than 10, less than 100 or less than 1000). Specifically, the cryptographic operation may be configured such that per originator the maximum number of different cryptographic values will not be exceeded (e.g., regardless of the number of subscriber terminals, or subscriptions, handled by the originator).

The cryptographic operation may comprise one or multiple operational steps so as to limit the number of different cryptographic values that can be generated to a maximum number. As an example, in order to limit the number of different cryptographic values, the FQDN of the originator, or a portion thereof, may be hashed and the resulting first hash value may be mapped on a limited number of spread values. In certain variants, a second hash value may be computed on the resulting spread value and the identifier associated with the message. The second hash value may be appended to or replace at least a portion of the FQDN, and a cryptographic key may then be applied thereto so as to obtain the cryptographic value.

The FQDN may comprise a prefix portion and a suffix portion. In certain variants, the prefix portion and the suffix portion may correspond to different network domain levels, wherein the prefix portion defines a sub-domain of the suffix portion. Some protocols refer to the different domain levels corresponding to the prefix portion and the suffix portion as realms. In such a case, the suffix portion may correspond to a root realm, and the prefix portion may be indicative of a particular network element ("origin realm") within the root realm.

The cryptographic operation may be selectively applied to one or both of the prefix portion and the suffix portion of the FQDN. In some implementations, only the prefix portion of the FQDN (plus the identifier or information derived from the identifier) is subjected to the cryptographic operation so as to obtain the cryptographic value. In such a case only the prefix portion of the FQDN may be substituted in the message with the cryptographic value (e.g., by appending the value to the suffix portion of the FQDN).

In a first variant, the message comprises the subscriber identifier. In this variant, the cryptographic operation may be applied on the FQDN and the subscriber identifier, or on information derived therefrom. In a second variant, the message does not comprise the subscriber identifier. In the latter variant, the cryptographic operation may be applied on the FQDN and the destination identifier. The destination identifier may be comprised in or linked to the message.

In both variants, or in a third variant, the message may comprise the session identifier. In this scenario, the session identifier may comprise the FQDN of the originator (i.e., the originator FQDN may be a part of the session identifier). The processing may then comprise processing at least a portion of the FQDN in the session identifier based on the cryptographic value so that the message includes a modified session identifier with the processed FQDN. In some cases it may thus be ensured that the originator FQDN is not exposed by the session identifier comprised in the message.

In certain implementations, the message may be a request message. In such implementations, the method may further comprise receiving, from the second network domain, an answer message responsive to the request message. The answer message may comprise the modified session identifier. The answer message may then be processed by restoring the processed FQDN in the modified session identifier to the FQDN of the originator. The restoring operation may comprise application of a cryptographic operation (e.g., based on the complementary key of the symmetric key pair described above).

The method may be performed by a proxy agent located at a border between the first network domain and the second network domain. As an example, the proxy agent may be located in the first network domain and interface the second network domain. Alternatively, the method may be performed by a proxy agent located at a border between the first network domain and an intermediate third network domain that connects to the second network domain. As an example, the a proxy agent may be located in the first network domain and interface the intermediate third network domain.

The message may generally be compliant with any application level protocol that provides message routing based on FQDNs. As an example, the message may be compliant with one of the Diameter protocol, the Radius protocol and the Hypertext Transfer Protocol (HTTP).

In certain implementations, the first network domain may be a trusted network domain (e.g., of a dedicated ISP or mobile network operator). Additionally, or in the alternative, the second network domain may be an untrusted network domain. Each network domain may be one of a visited and a home network (in an exemplary roaming scenario).

According to a second aspect, a method of processing a message for a subscriber session is provided, wherein the message is intended for a destination having an FQDN and wherein the destination is located in a first network domain. The method comprises receiving the message from a second network domain, wherein the message comprises an FQDN field having a value. The method further comprises determining the value of the FQDN field comprised in the message and applying a cryptographic operation on at least a portion of the value to restore at least a portion of the FQDN of the destination. Still further, the method comprises processing the message by substituting the value or a portion of the value in the FQDN field with the restored FQDN or FQDN portion of the destination, respectively, and forwarding the processed message towards the destination.

The cryptographic operation may comprise application of a symmetric cryptographic function. The symmetric cryptographic function may be based on the other key of the pair of symmetric cryptographic keys mentioned above. As an example, the cryptographic operation of the first method aspect may comprise an encryption (or cyphering) step while the cryptographic operation of the second method aspect comprises the complementary decryption (or decyphering) step.

The value of the FQDN field may comprise a prefix portion and a suffix portion as likewise explained above. In such a case only the prefix portion of the value may be subjected to the cryptographic operation to restore the prefix portion, and only the prefix portion of the value may be substituted with the restored prefix portion (i.e., the cryptographic value).

Also provided is a computer program product comprising program code portions to perform the steps of any of the methods and method aspects presented herein when the computer program product is executed by one or more processors. The computer program product may be stored on a computer-readable recording medium such as a semiconductor memory, hard-disk or optical disk. Also, the computer program product may be provided for download via a communication network.

According to a still further aspect, a network element for processing a message for a subscriber session is provided, wherein the message comprises an FQDN of an originator of the message, wherein the originator is located in a first network domain and wherein the message is directed towards a destination in a second network domain. The network element comprises an interface configured to receive the message. The network element further comprises a processor configured to determine the FQDN comprised in the message and to determine an identifier associated with the message, wherein the identifier comprises at least one of a subscriber identifier, a session identifier and a destination identifier. The processor is further configured to apply a cryptographic operation on the FQDN and the identifier, or an information derived therefrom, to generate a value, and to process the message by substituting at least a portion of the FQDN with a cryptographic value. Still further, the processor is configured to forward the processed message towards the second network domain.

According to another aspect, a network element for processing a message for a subscriber session is provided, wherein the message is intended for a destination having a FQDN and wherein the destination is located in a first network domain. The network element comprises an interface configured to receive the message from a second network domain, wherein the message comprises an FQDN field having a value. The network element further comprises a processor configured to determine the value of the FQDN field comprised in the message and to apply a cryptographic operation on at least a portion of the value to restore at least a portion of the FQDN of the destination. The processor is also configured to process the message by substituting the value or a portion of the value in the FQDN field with the recstored FQDN or the FQDN portion of the destination, respectively, and to forward the processed message towards the destination.

Any of the network elements described herein may be configured to perform the further methods and method steps presented herein. The network elements may be comprised by a mobility management system or a charging system. Furthermore, the functions of the network elements according to the above two aspects may be combined into a single network element, such as a single proxy agent.

BRIEF DESCRIPTION OF THE DRAWINGS

Further aspects, details and advantages of the present disclosure will become apparent from the following description of exemplary embodiments and the drawings, wherein.

DETAILED DESCRIPTION

In the following description, for purposes of explanation and not limitation, specific details are set forth, such as specific network domains, protocols, and so on, in order to provide a thorough understanding of the present disclosure. It will be apparent to one skilled in the art that the present disclosure may be practiced in embodiments depart from these specific details. For example, while some of the following embodiments will be described in the exemplary context of the Diameter protocol, it will be apparent that the present disclosure could also be implemented using other protocols, in particular application level protocols that provide message routing based on FQDNs. Moreover, while the present disclosure will partially be described in an exemplary roaming scenario, the present disclosure may also be implemented in connection with other communication scenarios.

Those skilled in the art will further appreciate that the methods, services, functions and steps explained herein below may be implemented using individual hardware circuitry, using software in conjunction with a programmed microprocessor or general purpose computer, using an Application Specific Integrated Circuit (ASIC) and/or using one or more Digital Signal Processors (DSPs). It will also be appreciated that the present disclosure could be implemented in connection with one or more processors and a memory coupled to the one or more processors, wherein the memory is encoded with one or more programs that cause the at least one processor to perform the methods, services, functions and steps disclosed herein when executed by the processor.

The following embodiments describe solutions that prevent topological information from leaving a dedicated network domain via outgoing messages. The embodiments will partially be described from the perspective of a proxy agent located at the boarder of adjacent network domains. In the solutions presented in the following embodiments, the proxy agent is configured to hide topological information in outgoing messages without the need of maintaining state information. In particular, the need for maintaining a mapping table that defines associations between pairs of internal and external host names can be avoided.

In the following description, the term "internal host name" denotes the originator identity, typically an originator FQDN, as used within a trusted network domain. The term internal host name will partially be abbreviated as "i_origin-host". In a similar manner, the term "external host name" denotes a substitute ("dummy") of the internal host name that can be exposed towards a potentially untrusted network domain. The term "external host name" is partially abbreviated as "e_origin-host". The external host name may have an FQDN-compliant format.

Figure 1:
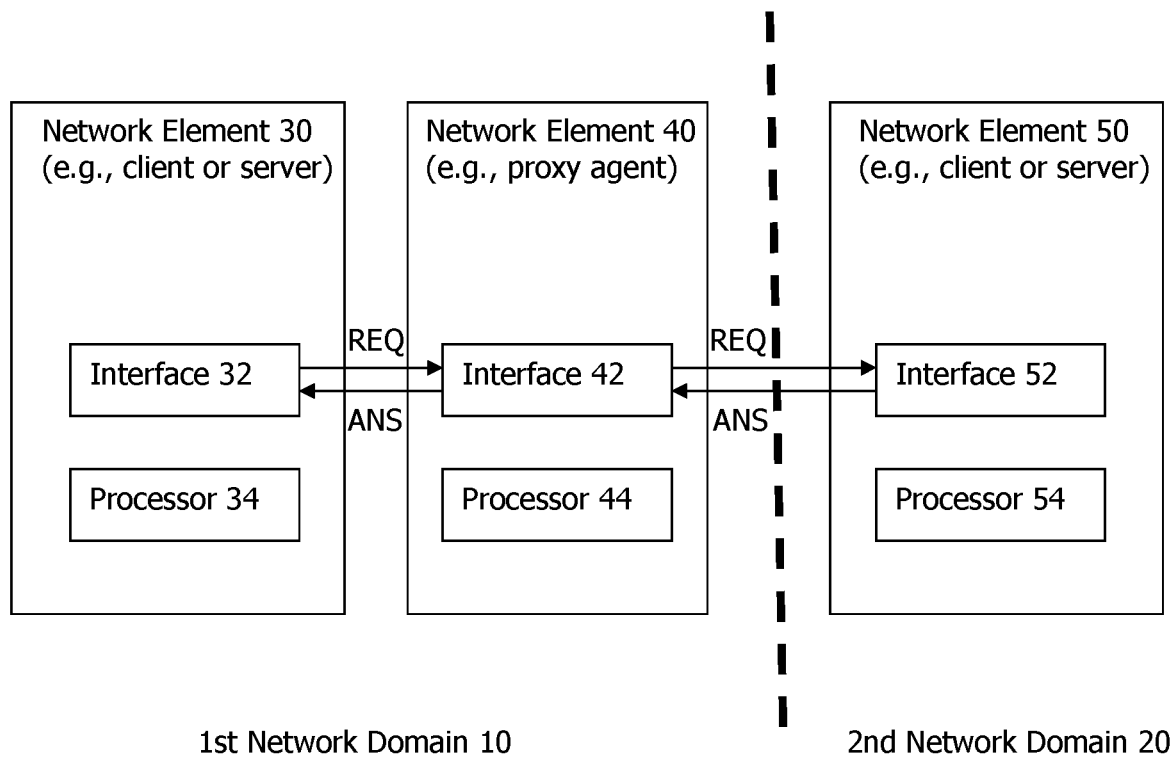
FIG. 1 illustrates a schematic diagram of a network system with network elements according to embodiments of the present disclosure.

FIG. 1 illustrates an embodiment of a network system comprising a first network domain 10 and a second network domain 20. In the following, it will be assumed that the first network domain 10 is a trusted network domain while the second network domain 20 is a potentially untrusted network domain. Each of the two network domains 10, 20 is a closed domain operated, for example, by a specific ISP or mobile network operator.

In the exemplary scenario illustrated in FIG. 1, two network elements 30, 40 are located in the first network domain 10 while a further network element 50 is located in the second network domain 20. The network element 30 in the first network domain 10 and the network element 50 in the second network domain 20 may have a client/server relationship in accordance with a dedicated application layer protocol, such as Diameter, Radius or HTTP. Each of the network elements 30, 50 may be operated as one or both of a client or server.

The network element 40 is configured to act a proxy agent interfacing both the network element 30 in the first network domain 10 and the network element 50 in the second network domain 20. It should be noted that one or more further network elements may operatively be located between the network element 30 and the network element 40 in the first network domain 10. Moreover, one or more further network elements and network domains may operatively be located between the network element 40 in the first network domain 10 and the network element 50 in the second network domain 20.

Each of the network elements 30, 40, 50 comprises an interface 32, 42, 52 and a respective processor 34, 44, 54. Although not shown in FIG. 1, each network element 30, 40, 50 further comprises a memory for storing program code to control the operation of the respective processor 34, 44, 54.

The interfaces 32, 43, 52 are generally configured to receive and transmit messages from and/or to other network elements. As illustrated in FIG. 1, an exemplary messaging process, also called transaction, may comprise the transmission of a request message from the network element 30 via the network element 40 to the network element 50. The network element 50 may respond to that request message from the network element 30 with an answer message. It will be appreciated that the present disclosure is not limited to the exemplary request/answer messaging process illustrated in FIG. 1.

Figure 2A:
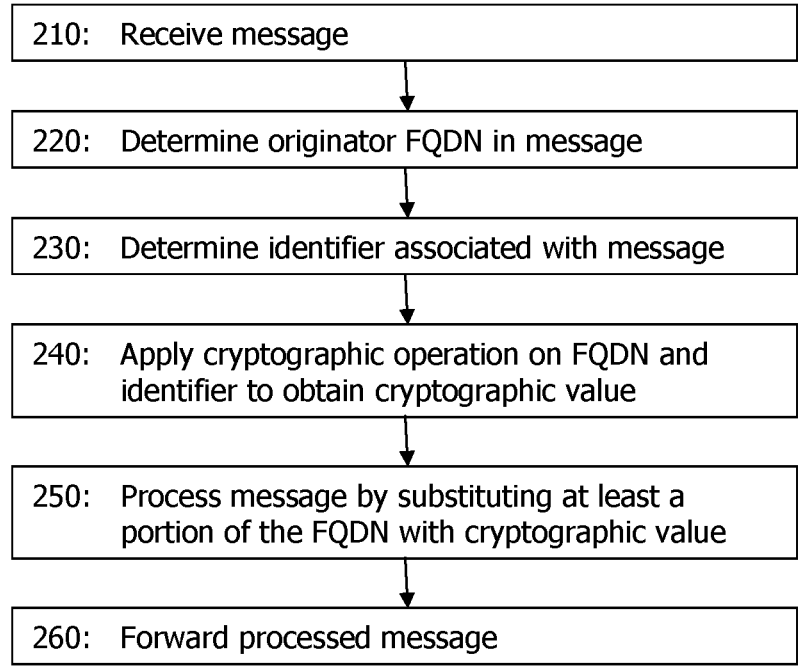
FIGS. 2A and 2B illustrate flow diagrams of two method embodiments of the present disclosure.
Figure 2B:
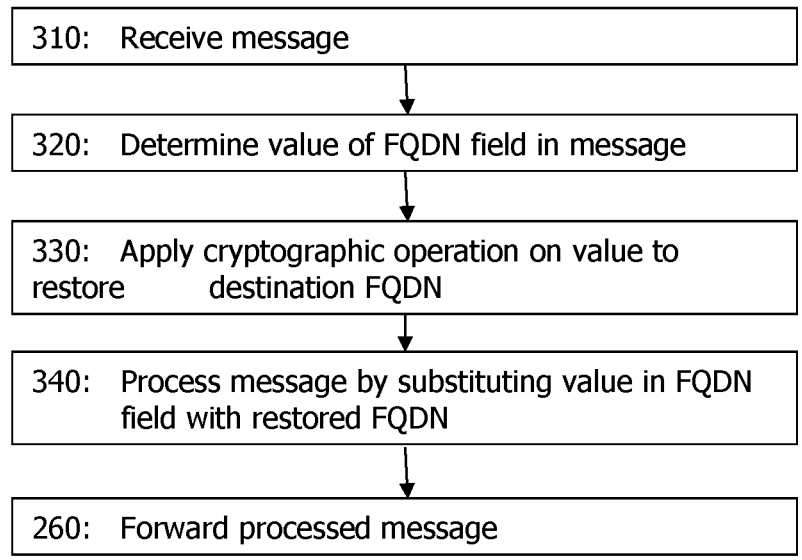

FIGS. 2A and 2B illustrate flow diagrams of exemplary method embodiments. The method embodiments will exemplarily be described with reference to the network element 40 (i.e., proxy agent) and the network system of FIG. 1. It will be appreciated that the method embodiments could also be performed using any other network elements.

The method embodiments in FIGS. 2A and 2B are performed to at least partially hide an FQDN of a message originator, such as the network element 30 in FIG. 1, by the network element 40. The corresponding message processing steps take place before the processed message is forwarded, by the network element 40, to a destination in the second network domain 20, such as the network element 50.

The method embodiments illustrated in FIGS. 2A and 2B are performed in connection with a subscriber session having a dedicated session identifier. The subscriber session may be a mobility management session, a charging session, or any other session for a dedicated subscriber, or subscriber terminal, as identified by a subscriber identifier.

In a first step 210, the network element 40 receives a message directly from the network element 30 or via one or more intermediate network elements in the first network domain 10. The message may be a request message addressed or otherwise directed to the network element 50 in the second network domain 20. The message generated by network element 30 will include a designated message field that specifies the identity of the network element 30 in the form of its FQDN. The FQDN in the message field is thus indicative of the network element 30 as the message originator. The corresponding originator FQDN in the designated message field may be used within the first network domain 10 for message routing, message validation and loop prevention as generally known in the art.

The message from the network element 30 will be received at the interface 42 of the network element 40 and processed by the associated processor 44. The following method steps will thus at least partially be performed by the processor 44.

As shown in FIG. 2A, the processor 44 will in a next step 220 determine the originator FQDN comprised in the message. Also, the processor 44 will in a further step 230 determine an identifier associated with (e.g., included in or linked with) the message. Steps 220 and 230 can be performed in any order and also simultaneously.

The identifier determined in step 230 may be at least one of a subscriber identifier, a session identifier, and a destination identifier. The subscriber identifier uniquely identifies the subscription underlying the ongoing subscriber session. As an example, the subscriber identifier may be an International Mobile Subscriber Identity (IMSI) or any other identifier capable of the unique identification of a subscription. The session identifier identifies the ongoing session and may be defined by the particular protocol governing the messaging exchange between the network element 30 and the network element 50. The destination identifier uniquely identifies the network element 50 and may take the form of an FQDN. It should be noted that the message received in step 210 will generally include two or all of the subscriber identifier, the session identifier, and the destination identifier. The corresponding identifiers can be included in designated fields in the message received in step 210.

In a further step 240, a cryptographic operation is applied on the FQDN determined in step 220 and the identifier determined in step 230, or on information derived therefrom. The cryptographic operation comprises one or more operational steps and generates a single cryptographic value from the FQDN and the identifier. The cryptographic value may generally take the form of a binary, decimal or hexadecimal number, or the form of a text string. In one embodiment, the FQDN and the identifier are combined (e.g., using a mathematical or string operation) to yield a combined value, and the cryptographic value is derived from that combined value using a cryptographic function, such as an encryption operation. The encryption operation may be performed using an encryption key that belongs to a symmetric key pair.

In a further step 250, the received message is processed by substituting at least a portion of the originator FQDN with the cryptographic value generated in step 240. As an example, the originator FQDN may be fully replaced by the cryptographic value. As a further example, only a portion of the originator FQDN may be substituted with the cryptographic value. If, for example, the FQDN comprises a prefix portion and a suffix portion, only the prefix portion of the FQDN may be subjected to the cryptographic operation in step 240, and only the prefix portion of the FQDN may be substituted with the cryptographic value in step 250. The prefix portion and the suffix portion may each correspond to a particular FQDN domain level.

In step 260 the processor 44 forwards the processed message with the at least partially hidden originator FQDN towards the second network domain 20. Specifically, the processor 44 forwards the processed message to the interface 42 of the network element 40. Via the interface 42, the processed message then leaves the first network domain 10 towards the network element 50. As stated above, the network element 50 may be identified in a destination FQDN field in the processed message.

FIG. 2B illustrates a flow diagram of a further method embodiment that may be performed by the network element 40 or any other network element within the first network domain 10 (e.g., by a network element deployed in a redundant manner in parallel to the network element 40 for load balancing or other purposes).

It will in the following be assumed that the method steps illustrated in FIG. 2B are performed temporally after the method steps illustrated in FIG. 2A. It will be understood that the method embodiment illustrated in FIG. 2B could also be performed independently of the method embodiment illustrated in FIG. 2A.

In an initial step 310, the network element 40 receives via its interface 42 and from the second network domain 20 (or any intermediate network domain) a message intended for the network element 30 as message destination. In the exemplary scenario illustrated in FIG. 1, the message received in step 310 may be an answer message generated and transmitted by the network element 50 responsive to a previous request message received from the network element 30. The request message may have been processed earlier by the network element 40 as discussed above with reference to FIG. 2A.

The message received in step 310 comprises one or more message fields and in particular a destination FQDN field having a particular value. In case the message is an answer message received responsive to a request message that has been processed as discussed above with reference to FIG. 2A, the value in the FQDN field will correspond to the corresponding value derived in processing step 250. In other words, the FQDN field value in the message received in step 310 will correspond to the hidden identity of the network element 30.

In a further step 320, the processor 44 of the network element 40 determines the value of the FQDN field. Then, in step 330, the processor 44 applies a cryptographic operation on the value determined in step 320 so as to restore at least a portion of the FQDN of the destination (i.e., of the network element 30). The cryptographic operation applied in step 330 will generally be an operation that is complementary to the cryptographic operation applied in step 240. If, for example, in step 240 an encryption function has been applied, a complementary decryption function will be applied in step 330. The encryption and decryption functions may be symmetric cryptographic functions (i.e., based on a symmetric key pair).

It will be appreciated that no mapping table or other state information needs to be maintained in the network element 40 in connection with applying the cryptographic operation in step 330. Rather, one and the same cryptographic operation, or a predefined set of different cryptographic operations, may be applied to all incoming messages from the second network domain 20 (i.e., regardless of the associated subscriber identifiers, subscriber sessions, and so on). As such, the memory resources of the network element 40 can be kept low, and multiple network elements 40 can more easily operate in (e.g., geographical) redundancy, since no state information has to be synchronized.

Then, in step 340, the message received in step 310 is processed by substituting the value, or a portion of the value, in the destination FQDN field with the FQDN (or the FQDN portion) restored in step 330. As such, the processed message will be correctly addressed to the network element 30 (in terms of its FQDN) and can be forwarded to the network element 30 in step 260. Forwarding step 260 may again comprise delivering, by the processor 44, the processed message to the interface 42 for being delivered in the first network domain 10 to the network element 30.

In the messaging scenarios discussed above with reference to FIGS. 2A and 2B, the topology of the first network domain 10 cannot be derived from the outgoing messages since the originator FQDN has at least partially been disguised by the cryptographic operation applied in step 240. As such, not only the topology of the network domain as such, but also any topological changes cannot be detected within the other network domain 20 or by any message interceptor outside the network domain 10.

In the following, more detailed embodiments will be described with reference to the exemplary network system illustrated in FIG. 3. The same reference numerals as in FIG. 1 will be used to denote the same or similar components.

Figure 3:
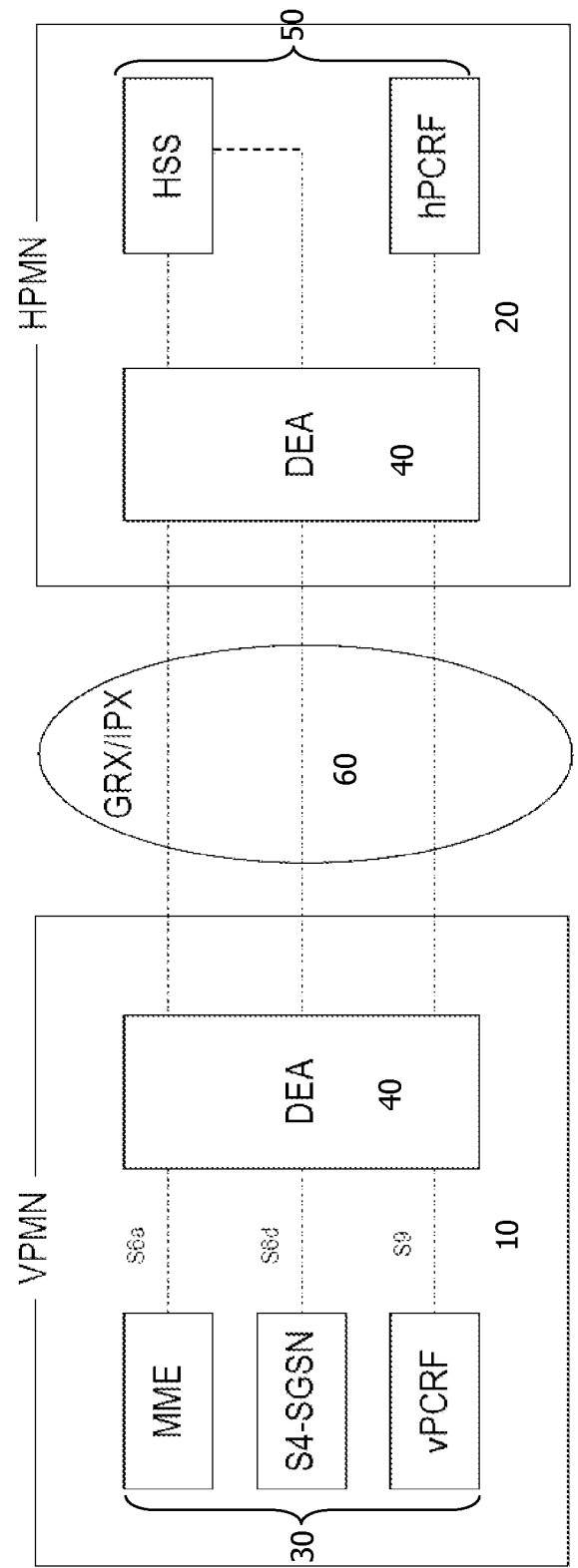
FIG. 3 illustrates another network system with further embodiments of network elements.

FIG. 3 schematically illustrates a network architecture for implementing a Diameter-based roaming scenario in connection with a Visited Public Mobile Network (VPMN) as a first network domain 10 and a Home Public Mobile Network (HPN) as a second network domain 20. The two network domains 10, 20 are interconnected by an intermediate network domain 60 denoted as GRX/IPX (see, e.g., GSM Association Official Document IR.88-LTE Roaming Guidelines Version 9.0, 24 Jan. 2013).

The VPMN 10 comprises multiple network elements 30 attached to a proxy agent in the form of a DEA 40. The VPMN network elements 30 in the embodiment of FIG. 3 take the form of a Mobility Management Entity (MME), an S4 Serving GPRS Support Node (S4-SGSN) and a visited Policy and Charging Rules Function (vPCRF) connected via S6a, S6d and S9 interfaces to respective interfaces of the DEA 40 (see reference numeral 42 in FIG. 1). In a similar manner, the HPMN 20 comprises a DEA 40 having the same function as the DEA 40 of the VPMN 10. Furthermore, the HPMN 20 comprises two network elements 50 in the form of a Home Subscriber Server (HSS) and a home PCRF (hPCRF, respectively).

In the following, further embodiments of the present disclosure will be described with general reference to a network system in which at least one of the VPMN 10 and the HPMN 20 comprises a DEA 40, and in which each of the VPMN 10 and the HPMN 20 comprises at least one network element configured to operate as Diameter client and Diameter server, respectively. For illustrative purposes, the following embodiments will be described without explicit reference to any intermediate network domain such as the DRX/IPX domain 60 illustrated in FIG. 3.

FIGS. 4 and 6 to 12 schematically illustrate signalling diagrams that may be implemented in the network system illustrated in FIG. 3 or a similar network system as generally illustrated in FIG. 1. The signalling processes illustrated in FIGS. 4 and 6 to 12 may in particular be performed in connection with the method steps illustrated in FIGS. 2A and 2B. The signalling diagrams are described with reference to exemplary subscriber sessions, wherein FIGS. 4 to 8 pertain to mobility management sessions, while FIGS. 9 to 12 pertain to charging sessions.

In a mobility management session, a cryptographic operation as performed in step 240 will generate the same cryptographic value for a particular subscription as long as the same originator (network element 30) serves the particular session. In a charging session, the cryptographic operation performed in step 240 generates different cryptographic values for different subscriber sessions of one and the same subscription. In certain variants of both cases, the cryptographic operation applied in step 240 is configured such that the number of different cryptographic values that can be generated (e.g., for originating network element 30) is limited to a maximum number.

In the Diameter-based embodiments presented herein, the processing of incoming messages by the DEA 40 will be based on information included in dedicated message fields also called Attribute Value Pairs (AVPs). Details in this regard, and in the regard of the Diameter protocol in general in terms of the present embodiments, are described in the Internet Engineering Task Force (IETF) Request for Comments (RFC) 6733 of October 2002 (ISSN: 2070-1721).

In the following, the hiding of topological information for mobility management sessions will be described first with reference to references 4 to 8. In this regard, message processing by the DEA 40, and in particular the applied cryptographic operation, depends on whether or not the message to be processed contains a subscriber identifier. If the message to be processed contains a subscriber identifier, the cryptographic operation is based on the subscriber identifier as well as on the originator FQDN (i.e., i_origin-host). In case the message to be processed does not contain a subscriber identifier, the cryptographic operation is based on i_origin-host (i.e., as received in a request message) and the destination identifier (e.g., the originator FQDN as received in the corresponding answer message).

In general, the first approach can be used in order to hide MME identities, while the second approach can be used to hide HSS identities. There may exist exceptions, for example in the case of a Cancel Location Request message (CLR), which contains a subscriber identifier. However, since that message is directed from the HSS to the MME, the originator FQDN as well as the destination FQDN are input to the cryptographic operation. A exception is also applied to the answer message CLA from the MME to the HSS.

The Diameter messages considered in the following embodiments contain topological information in clear text not only in the message field indicating the originator FQDN. Rather, such information is also contained in the session identifier (which includes the originator FQDN) and in an optional route record that tracks a route of a message within the VPMN 10. For this reason the DEA 40 strips the route record from a message before forwarding it towards the HPMN 20. Moreover, the originator FQDN, or at least a portion thereof, is not only substituted in the message field dedicated to the originator FQDN with the cryptographic value, but also in the message field dedicated to the session identifier as will now be described in greater detail.

Figure 4:
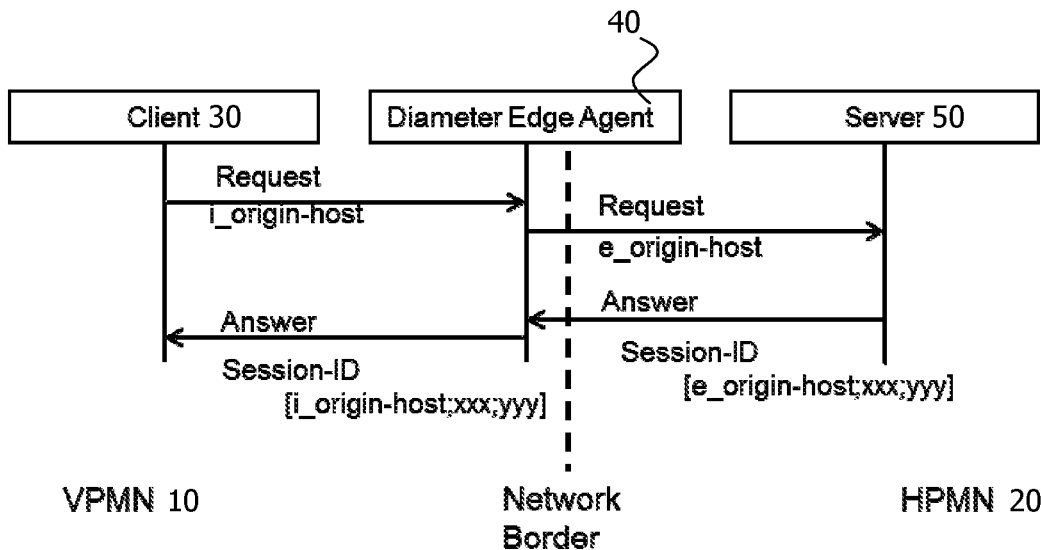
FIGS. 4 and 6 to 12 illustrate signalling diagrams in accordance with embodiments of the present disclosure.

The signalling diagram of FIG. 4 illustrates the scenario of a Diameter request/answer messaging procedure (e.g., in connection with ULR/ULA messages). In such a scenario the network element 30 in the VPMN 10 is the initiator of a request message (client) and the network element 50 in the HPMN 20 the destination of the request message (server). A corresponding answer message will be transmitted responsive to the request message from the server 50 to the client 30. Both the request message and the answer message are routed via the DEA 40 and processed by the DEA 40.

The request message received by the DEA 40 from the client 30 generally contains multiple AVPs indicative of i_origin-host, a session identifier and a route record. As explained above, the route record is simply stripped by the DEA 40 from the request message prior to transmitting it to the server 50. A content of the AVP for i_origin-host will be processed by the DEA 40 as will now be described in more detail with reference to FIGS. 5A and 5B.

In brief, a portion of the FQDN corresponding to i_origin-host in encrypted. Specifically, the prefix of i_origin-host is encrypted, while the suffix of i_origin-host is not changed. The prefix of i-origin-host corresponds to the host name of client 30, which has been stripped off of the pre-configured realm. The route realm value corresponding to the i_origin-host suffix does not expose any internal realm structure and therefore does not permit to derive significant topological information with respect to the VPMN 10. As such, the i_origin-host suffix may in clear text leave the trusted network domain 10.

Figure 5A:
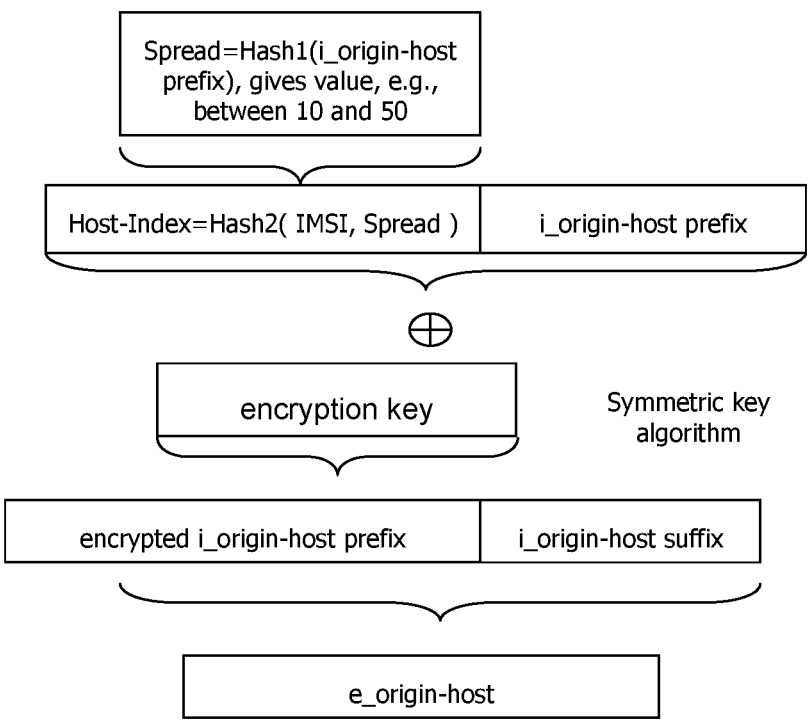
FIGS. 5A and 5B illustrate embodiments of a cryptographic operation and the associated message processing steps.

In the embodiment illustrated in FIG. 5A, further cryptographic steps are applied in addition to a mere encryption of the i_origin-host prefix so as to limit the number of different cryptographic values that can be generated to a maximum number. Generally, for a specific subscriber terminal hosted by a specific client 30 (typically the MME in the present mobility management scenario), always the same "dummy" host address e_origin-host is exposed towards the HPMN 20. However, different subscriber terminals hosted by one and the same MME 30 will result in different "dummy" host addresses e_origin-host. It may in certain variants be desired to limit the number of such "dummy" host addresses to ensure that the remote server 50 (e.g., the HSS) in the HPMN 20 will have to store only a limited list for use during, for example, a reset procedure. The corresponding cryptographic steps to reduce the maximum number of "dummy" host addresses exposed towards the HPMN 20 is illustrated in FIG. 5A. The steps illustrated in FIG. 5A may generally correspond to steps 240 and 250 in FIG. 2A.

Initially, the i_origin-host suffix corresponding to the root realm (i.e., the pre-configured realm as defined in 3GPP TS 23.003, Version 12.4.1, mainly Chapters 13 and 19) is stripped off of the i_origin-host as determined by the DEA 40 from the corresponding AVP in the request message. This operational step yields the i_origin-host prefix of the client 30. Then, a first hash function is applied to the remaining address string corresponding to the i_origin-host prefix. The resulting hash value is mapped on a predefined range [minSpread, maxSpread], such as [10, 50]. This range defies the maximum number of exposed addresses for a given client 30. The resulting spread value depends on the string that corresponds to the i_origin-host prefix.

In a next step, the subscriber identity (e.g., the IMSI) or any other identifier of the ongoing mobility management session (such a session identifier) is extracted from the request message. In a further step, a second hash function is applied to the spread and the identifier. The resulting hash value is also called host index hereinafter.

Then, the host index is concatenated with the i_origin-host prefix. The resulting string is encrypted with a secret key (i.e., by applying a symmetric cryptographic algorithm) to obtain a cryptographic value in the form of a character string. The corresponding encryption process may be performed such that the character string is generally FQDN compliant (i.e., does not contain any strange characters).

In a further step, the i_origin-host suffix (i.e., the root realm) is appended to the cryptographic value resulting from application of the symmetric cryptographic function. In other words, the prefix portion of i_origin-host is substituted with the cryptographic value in order to obtain the e_origin-host address. Since e_origin-host still follows the FQDN requirements, any receiving peer will be able to handle this identity in accordance with RFC 6733.

As already briefly explained above, also the i_origin-host address in the session identifier AVP of the request message is replaced by e_origin-host. Furthermore, all route records in the request message are removed prior to being transmitted towards the server 50.

Responsive to receipt of the request message, the server 50 will respond with an answer message as shown in FIG. 4. The answer message may include a session identifier, and the session identifier, in turn, may include e_origin-host as received by the server 50 in the request message. Thus, upon receipt of the answer message by the DEA 40, the DEA 40 will have to restore i_origin-host in the session identifier before it can be forwarded to the client 30. To restore i_origin-host, the DEA 40 will apply the inverse operations as illustrated in FIG. 5A using the corresponding decryption key of the symmetric key pair. In brief, the DEA 40 decrypts the i_origin-host prefix included in e_origin-host, removes the host index from the result of the decryption step and appends the resulting i_origin-host prefix to the i_origin-host suffix as included in e_origin-host.

Figure 5B:
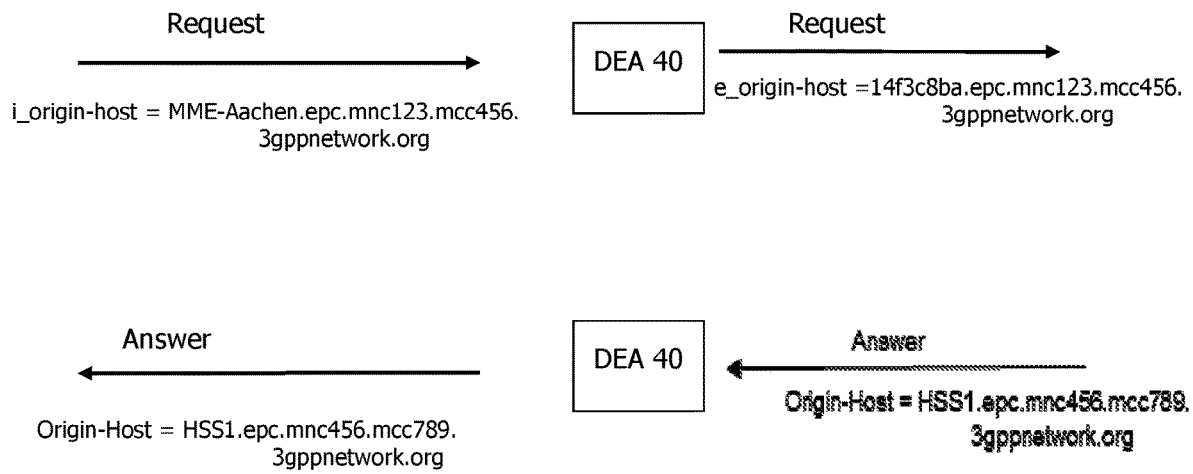

FIG. 5B illustrates how an exemplary FQDN corresponding to i_origin-host is "translated" into an FQDN that corresponds to e_origin-host and hides the i_origin-host prefix "MME-Aachen". FIG. 5B also shows that the origin host information contained in the answer message (i.e., the server 50 denoted "HSS1") is not processed at all by the DEA 40. It should be noted that the processing of the session identifier included in the answer message is not shown in FIG. 5B.

Figure 6:
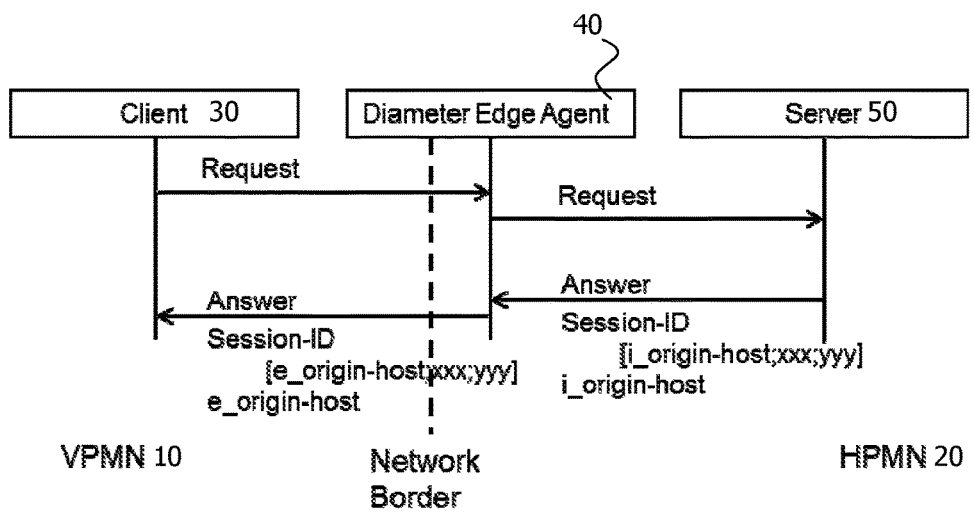
Figure 7:
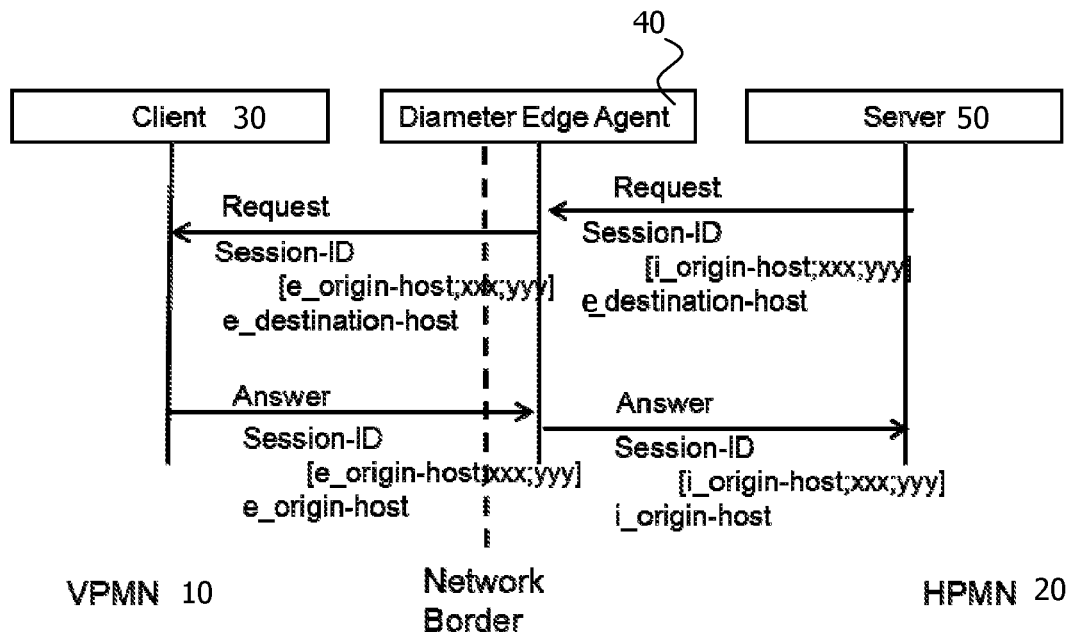
Figure 8:
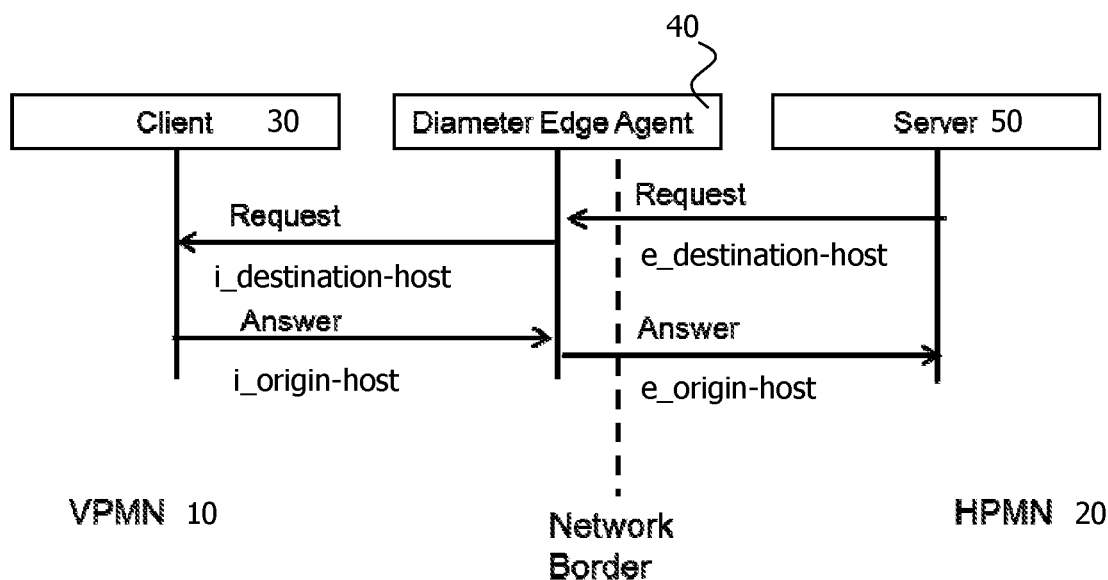

FIGS. 6 to 8 show alternative messaging scenarios in connection with mobility management sessions similar to the one described above with reference to FIGS. 4, 5A and 5B. For this reason, only the major differences will be described in more detail.

FIG. 6 illustrates a messaging scenario in which an outgoing answer message is processed by a DEA 40 within HPMN 20. In this regard, i_origin-host is processed as explained above to obtain e_origin-host, and e-origin-host is also replaced in the session identifier by e_origin-host.

FIG. 7 illustrates processing of an outgoing request message by the DEA 40 in the HPMN 20. In the scenario illustrated in FIG. 7, the root realm is stripped of both, i_origin-host as carried in the origin-host AVP and the destination-host AVP value _destination-host. The destination identifier will be used in a similar manner as the subscriber identifier in the scenario of FIGS. 4, 5A and 5B to calculate the spread, and the further processing also follows that scenario.

Furthermore, i_origin-host in the session identifier is replaced by e_origin-host as explained above. Also, e_origin-host is replaced by i_origin-host in the addressing AVPs as well as in the session identifier of the answer message that is received as a result of the request message.

Finally, FIG. 8 illustrates a signalling diagram for an incoming request message at the DEA 40 of the VPMN 10. Specifically, the DEA 40 strips the root realm off of e_destination-host. The remaining address string is decrypted using a decryption key that belongs to a symmetric encryption algorithm as explained above. Then, the root realm is again appended to the decrypted string, resulting in i_destination-host. As explained above, one or more parts of the decrypted string may need to be removed (e.g., the host index) in this context. In the answer message that is received as a result of the incoming request message, i_origin-host is replaced with the e_destination-host as received with the request message.

In the following, further embodiments of signalling diagrams for charging sessions will be described with reference to FIGS. 9 to 12. As will be understood, all messages pertaining to a charging session (for off-line or on-line charging) typically use the same session identifier. By analysing the session identifier, each message can thus be unambiguously related to a particular session.

In certain variants of the following embodiments, the cryptographic operations may be applied to the originator FQDN as contained in a received (e.g., request) message, optionally applying the spread-based limiting approach described above, and a pre-configured "dummy" value. With that, the DEA 40 may compute e_origin-host that replaces i_origin-host (e.g., as contained in the session identifier). The pre-configured "dummy" value may in certain variants replace the origin-host AVP value. In addition, the DEA 40 may remove any sub-realm in the origin-realm AVP, leaving the root realm, only. When the answer message is received, the DEA 40 may restore the session identifier to the value it previously received in the request message.

Figure 9:
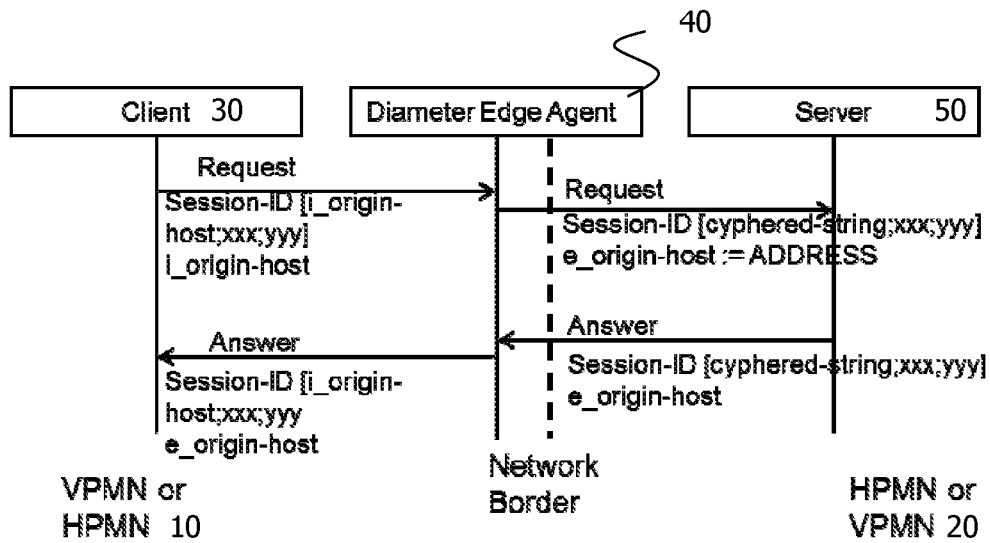
Figure 10:
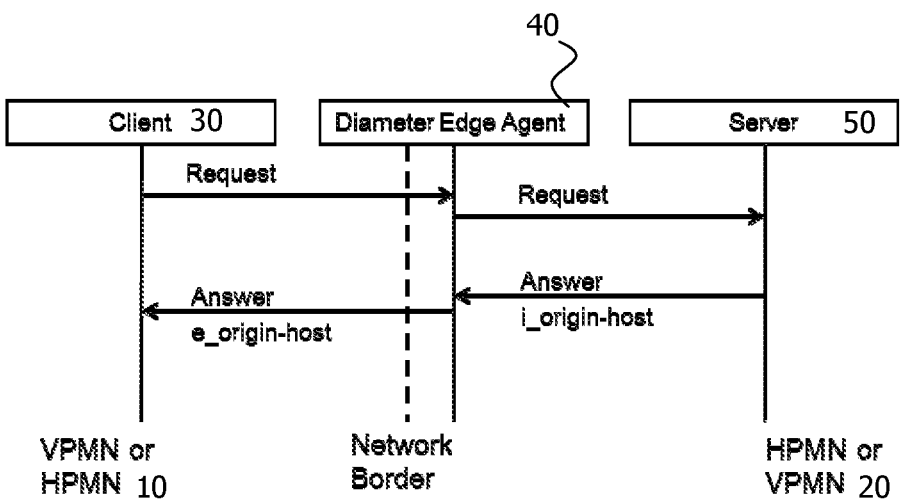

The signalling diagram of FIG. 9 illustrates how e_origin-host can be derived from i_origin-host of an outgoing transaction in the network domain 10 hosting the DEA 40 and the charging client 30.

In this regard, the string before the root realm of i_origin-host may be replaced with the pre-configured "dummy" string. In the example of FIG. 9, the preconfigured string is "ADDRESS". The resulting string is used as e_origin-host.

Various possibilities exist for processing the i_origin-host part of the session identifier. In a first approach, that part is encrypted using a secret encryption key that belongs to a symmetric cryptographic function as generally explained above. Alternatively, a cryptographic hash function may apply instead. This approach is in particular applicable for charging applications where the server 50 does not initiate any transaction, but only the client 30. A server-initiated transaction can be covered in accordance with the embodiment discussed with reference to FIG. 12 below.

Signalling diagram 10 pertains to an outgoing answer message of an inbound transaction in the network domain 20 hosting the DEA 40 and the charging server 50. Initially, the route realm is stripped off of i_origin-host. The remaining address string is encrypted with a secret encryption key that again belongs to a symmetric encryption algorithm. In certain implementations, the original session identifier may be hashed to get a spread as explained above. In this manner, one obtains multiple, but a restricted number of e_origin-host addresses (instead of only one per e_origin-host). The resulting cryptographic value is appended to the root realm, and the resulting concatenated string is again used as e_origin-host, as explained above with reference to FIGS. 4, 5A and 5B.

Figure 11:
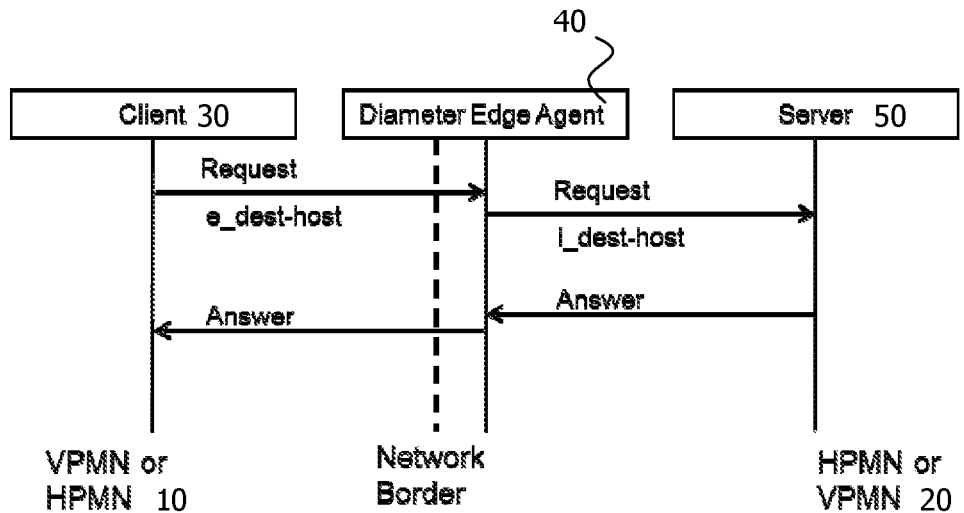

FIG. 11 illustrates a messaging scenario with an incoming request message (of an inbound transaction) in the network domain 20 hosting the DEA 40 and the charging server 50.

If it is found in the scenario of FIG. 11 that there is no destination-host AVP in the request message, nothing is done. If, however, the destination-host AVP is included in the request message, then the root realm is stripped off of the e_destination-host (in the destination-host AVP). Then, the remaining address string is encrypted with a secret encryption key using again a symmetric cryptographic algorithm. The resulting cryptographic value is appended to the route realm, and the resulting, concatenated string is used as i_destination-host (see FIGS. 4, 5A and 5B). The handling of the answer message is a result of the incoming request message can be performed as explained with reference to FIG. 10 above.

Figure 12:
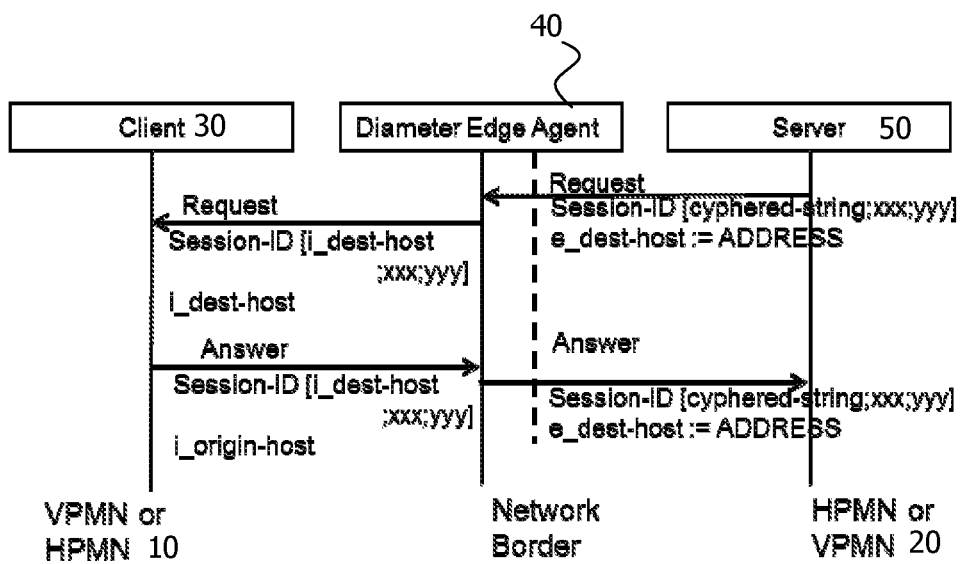

Finally, FIG. 12 illustrates a scenario for deriving i_dest-host from e_dest-host for an incoming request message (of an inbound transaction) in the network domain 10 hosting the DEA 40 and the charging client 30.

Initially, the i_dest-host string of the received session identifier is decrypted by applying a symmetric encryption algorithm as explained above. The resulting decrypted string is replacing the host string in the session identifier. The destination-host AVP value is likewise changed to the decrypted string. In the answer message received as a result of the incoming request message, the i_origin-host value is replaced with a preconfigured string according to signalling diagram in FIG. 8. Also the session identifier is replaced with the session identifier as received with the request message.

As has become apparent from the exemplary embodiments, the approach presented herein permits to mitigate several of the problems set forth in the introductory portion of the description. Specifically, since there is no need to keep state information in the proxy agent, the local storage system that would otherwise be needed for maintaining state information can be avoided. Regarding processing load, there is no need to look-up the state information as it is always readily available in the received message. Thus, there are benefits in terms of both memory and processor capacity.

Also, since the messages are self-contained as far as state information is concerned, there is no need for data synchronization between mated pairs of proxy agents. As a result, they will be less signalling traffic.

Further, the proxy agent needs to detect session initiations only and does not need to care about sessions that have silently been terminated. As a result, the approach presented herein is more robust and less complex, which has evident advantages in terms of development and maintainability.

While the present invention has been described in relation to exemplary embodiments, it is to be understood that the present disclosure is for illustrative purposes only. Accordingly, it is intended that the invention be limited only by the scope of the claims appended hereto.

The invention claimed is:

1. A method of processing a message for a subscriber session, the method performed by a network element and comprising:
    extracting a Fully Qualified Domain Name (FQDN) from a message wherein the message originator is located in a first network domain and the message is directed towards a destination in a second network domain;
    determining an identifier associated with the message, wherein the identifier comprises at least one of a subscriber identifier, a session identifier and a destination identifier;
    applying a cryptographic operation on the FQDN and the identifier, or on information derived from both the FQDN and the identifier, to generate a cryptographic value;
    substituting at least a portion of the FQDN with the cryptographic value; and
    forwarding the processed message towards the second network domain.

2. The method of claim 1, wherein the cryptographic operation comprises application of a symmetric cryptographic function.

3. The method of claim 1, wherein the cryptographic operation generates the same cryptographic value for a particular subscription as long as the same originator serves the particular subscription.

4. The method of claim 1, wherein the cryptographic operation generates different cryptographic values for different subscriber sessions of a particular subscription.

5. The method of claim 1, further comprising:
    hashing the FQDN of the originator, or a portion thereof, wherein the hash limits the number of different cryptographic values; and
    mapping a resulting first hash value on a limited number of values within a spread of values.

6. The method of claim 1, wherein the FQDN comprises a prefix portion and a suffix portion, and wherein only the prefix portion of the FQDN is subjected to the cryptographic operation and wherein only the prefix portion of the FQDN is substituted with the cryptographic value.

7. The method of claim 1, wherein the message does not comprise the subscriber identifier, and wherein the cryptographic operation is applied on the FQDN and the destination identifier.

8. The method of claim 1, wherein
the message comprises the session identifier,
the session identifier comprises the FQDN of the originator, and
processing comprises processing at least a portion of the FQDN in the session identifier based on the cryptographic value so that the message includes a modified session identifier.

9. The method of claim 1:
wherein the message is a request message, and
further comprising:
receiving from the second network domain, an answer message responsive to the request message, wherein the answer message comprises the modified session identifier; and
restoring the processed FQDN to the FQDN of the originator.

10. The method of claim 1, wherein the message is compliant with one of the Diameter protocol, the Radius protocol, and the Hypertext Transfer Protocol.

11. The method of claim 1, wherein
the first network domain is a trusted network domain; and
the second network domain is an untrusted network domain.

12. A network element for processing a message for a subscriber session, the network element comprising a hardware processor and non-transitory computer readable recording medium, the non-transitory computer readable recording medium containing instructions that when executed by the processor cause the network element to:
extract a Fully Qualified Domain Name (FQDN) from a message wherein the message originator is located in a first network domain and the message is directed towards a destination in a second network domain;
determine an identifier associated with the message, wherein the identifier comprises at least one of a subscriber identifier, a session identifier and a destination identifier;
apply a cryptographic operation on the FQDN and the identifier, or on information derived from both the FQDN and the identifier, to generate a cryptographic value;
substitute at least a portion of the FQDN with the cryptographic value; and
forward the processed message towards the second network domain.

13. The network element of claim 12, wherein the cryptographic operation generates the same cryptographic value for a particular subscription as long as the same originator serves the particular subscription.

14. The network element of claim 12, wherein the cryptographic operation generates different cryptographic values for different subscriber sessions of a particular subscription.

15. The network element of claim 12, wherein the network element is further configured to:
hash the FQDN of the originator, or a portion thereof, wherein the hash limits the number of different cryptographic values; and
map a resulting first hash value on a limited number of values within a spread of values.

16. The network element of claim 12, wherein the FQDN comprises a prefix portion and a suffix portion, and wherein only the prefix portion of the FQDN is subjected to the cryptographic operation and wherein only the prefix portion of the FQDN is substituted with the cryptographic value.

17. The network element of claim 12, wherein the message does not comprise the subscriber identifier, and wherein the cryptographic operation is applied on the FQDN and the destination identifier.

18. The network element of claim 12, wherein
the message comprises the session identifier,
the session identifier comprises the FQDN of the originator, and
the network element is further configured to process the FQDN such that at least a portion of the FQDN in the session identifier is processed based on the cryptographic value so that the message includes a modified session identifier.

19. The network element of claim 12:
wherein the message is a request message, and
wherein the network element is further configured to:
receive from the second network domain, an answer message responsive to the request message, wherein the answer message comprises the modified session identifier; and
restore the processed FQDN to the FQDN of the originator.

20. The network element of claim 12, wherein the message is compliant with one of the Diameter protocol, the Radius protocol, and the Hypertext Transfer Protocol.

* * * * *